(12) United States Patent
Maruoka et al.

(10) Patent No.: US 7,852,777 B2
(45) Date of Patent: Dec. 14, 2010

(54) NETWORK HARDWARE DEVICE

(75) Inventors: Toshihiko Maruoka, Osaka (JP);
Tsukasa Yoshiura, Osaka (JP); Junichi Yasui, Osaka (JP)

(73) Assignee: Panasonic Corporation, Osaka (JP)

( * ) Notice: Subject to any disclaimer, the term of this patent is extended or adjusted under 35 U.S.C. 154(b) by 990 days.

(21) Appl. No.: 11/515,768

(22) Filed: Sep. 6, 2006

(65) Prior Publication Data

US 2007/0053301 A1 Mar. 8, 2007

(30) Foreign Application Priority Data

Sep. 7, 2005 (JP) ............... 2005-258613

(51) Int. Cl.
*H04L 12/28* (2006.01)

(52) U.S. Cl. ............... 370/244; 370/241; 370/419; 710/260

(58) Field of Classification Search ............... None
See application file for complete search history.

(56) References Cited

U.S. PATENT DOCUMENTS 5,943,479 A * 8/1999 Klein et al. ............... 709/212

2004/0240921 A1* 12/2004 Koike et al. ............... 400/76
2005/0254488 A1* 11/2005 Huang ............... 370/389

FOREIGN PATENT DOCUMENTS

WO    WO 00/52586    9/2000

\* cited by examiner

*Primary Examiner*—Ayaz R Sheikh
*Assistant Examiner*—Nicholas Sloms
(74) *Attorney, Agent, or Firm*—Steptoe & Johnson LLP (57) ABSTRACT

A network hardware device of the invention includes a reception section receiving data from a network, and outputting a reception completion signal, a timer section measuring a preset time, and a delay section generating an interrupt signal so as to notify a host CPU of completion of the reception. When the timer section does not measure a time, the delay section generates an interrupt signal upon reception of the reception completion signal. On the other hand, when the timer section measures a time, upon reception of the reception completion signal, the delay section generates an interrupt signal after the timer section measures a preset time.

8 Claims, 9 Drawing Sheets

NETWORK HARDWARE DEVICE

BACKGROUND OF THE INVENTION (1) Field of the Invention

The present invention relates to a network hardware device establishing a connection with a network, and including a computer or a controller capable of executing processing based on data transmitted from the network.

(2) Description of the Related Art

Due to improved communication performance of a network, a network hardware device performing data communication becomes insufficient in processability, so that a function other than the data communication of the network hardware device is degraded. Herein, the network hardware device refers to a device functioning as a home appliance such as a DVD recorder or a television set and, also, functioning as a network. If the function other than the data communication is degraded, the network hardware device fails to function as a home appliance in some cases. This case is inappropriate. In order to prevent the aforementioned disadvantage, therefore, the network hardware device adopts polling so as to execute processing at regular intervals.

On the other hand, as disclosed in JP2002-538550A, a computer without a function of a home appliance has the following configuration. A host computer or a host controller (a host CPU) executing processing based on data transmitted from a network reduces frequency of reception interrupt by the network by using a timer. A reception packet counter counts up received packets. As a result of confirmation using a threshold that packets in predetermined number are transmitted since previous reception interrupt, reception interrupt is occurred. Thus, overflow in a reception buffer can be prevented and all pieces of received data can be subjected to processing efficiently.

However, the conventional method using a timer and a threshold based on count of received packets has the following problem. If many packets each having a small data size are received, interrupt by arrival of a packet count threshold is occurred frequently at an interval shorter than a preset interval. Consequently, in a host CPU, a function of a home appliance is out of control or processing is delayed.

On the other hand, polling has the following problem. A host CPU must confirm reception of data. Consequently, a function of a home appliance is degraded even when no data is received.

SUMMARY OF THE INVENTION

The present invention is made to solve the aforementioned problems. It is an object of the present invention to provide a network hardware device capable of maintaining a control of a home appliance even in a case of receiving many packets, and capable of eliminating an unnecessary process for confirming reception of packets in a case of receiving no packet.

In order to achieve this object, the present invention provides a network hardware device connected to a network, comprising: a host controller (or a host computer) executing processing based on data transmitted from the network; a reception buffer storing data transmitted from the network; a reception section receiving data transmitted from the network, allowing the reception buffer to store the received data, and outputting a completion signal indicating one of completion of the reception and occurrence of an error; a timer section measuring a preset time, and enabling a WAIT signal during the measurement; and a delay section generating an interrupt signal indicating one of completion of the reception and occurrence of the error upon reception of the completion signal from the reception section, outputting the interrupt signal to the timer section and the host controller when the timer section disables a WAIT signal, suspending output of the interrupt signal when the timer section enables a WAIT signal, and outputting the interrupt signal to the timer section and the host controller when the timer section disables a WAIT signal again, wherein the timer section starts to measure a time upon reception of an interrupt signal from the delay section, enables a WAIT signal during the measurement, and disables a WAIT signal after a lapse of a preset time.

According to this configuration, an interval of occurrence of an interrupt signal to be received by a host controller becomes longer than a time interval preset in a timer section without depending on a count of received packets and a length of processing time. Thus, it is possible to provide a network hardware device with a reception interrupt delay function by which reception interrupt indicating reception of data from a network does not occur during a preset time.

DESCRIPTION OF THE PREFERRED EMBODIMENTS

Hereinafter, description will be given of preferred embodiments of the present invention with reference to the drawings.

First Embodiment

Figure 1:
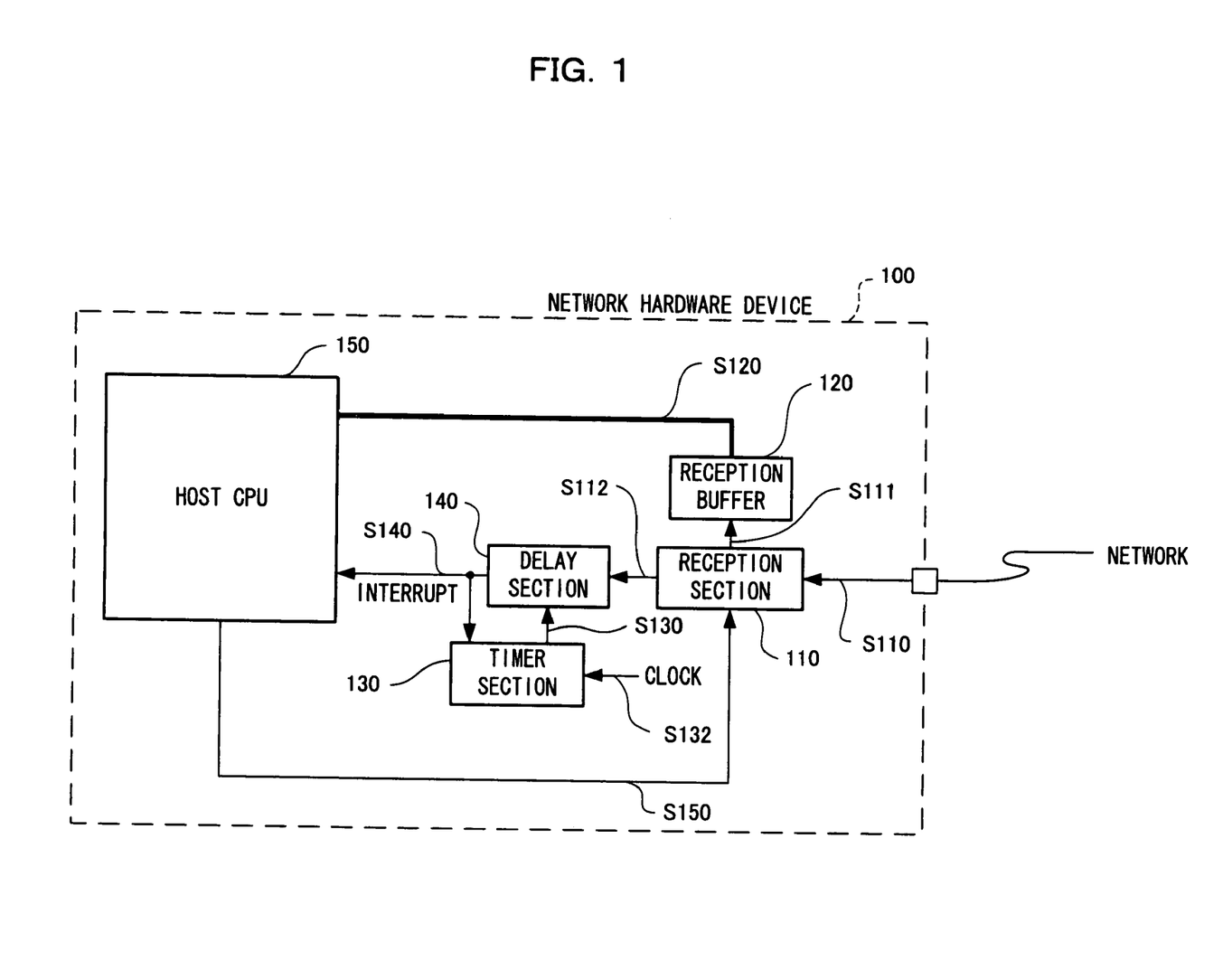
FIG. 1 is a block diagram illustrating a configuration of a network hardware device according to a first embodiment of the present invention.

FIG. 1 is a block diagram illustrating main components of a network hardware device according to a first embodiment of the present invention.

As illustrated in FIG. 1, the network hardware device (the main body) 100 according to the first embodiment of the present invention actually controls a home appliance, establishes a connection with a network, and includes a host CPU (a host controller) 150 capable of executing processing based on data transmitted from the network, a reception section 110, a reception buffer 120, a timer section 130, and a delay section 140.

Of plural pieces of data S110 transmitted from the network, the reception section 110 allows the reception buffer 120 to store data S111 to be received by the network hardware device 100. Upon completion of storage of the data S111 in the reception buffer 120 or upon occurrence of an error at the reception buffer 120, the reception section 110 outputs a reception completion signal S112. The aforementioned error occurs in a case that a storage space of the reception buffer 120 is insufficient to store data to be received, in other words, the reception buffer 120 that becomes full of data fails to newly receive data corresponding with one packet. Upon occurrence of such an error, the reception section 110 outputs a reception completion signal S112 indicating an error.

As described above, the reception buffer 120 stores the data S111 outputted from the reception section 110. Herein, the reception buffer 120 is connected to the host CPU 150.

The host CPU 150 receives a (reception) interrupt signal S140 (to be described later) from the delay section 140 and, then, executes reception error processing or reads reception data S120 from the reception buffer 120 to execute reception processing. Upon completion of each processing, the host CPU 150 outputs a processing completion signal S150 to the reception section 110 to halt output of the reception completion signal S112 by the reception section 110.

Next, description will be given of the timer section 130 with reference to a block diagram in FIG. 2. The timer section 130 includes an edge detection unit 131, an RS latch 132, an AND gate 133 receiving a clock S132 and a WAIT signal S130 outputted from the RS latch 132, a counter 134, and a register 135.

The register 135 reloads, as an initial value, a preset time on the counter 134.

The counter 134 uses, as an initial value, the timeout putted from the register 135. If the RS latch 132 outputs a WAIT signal S130 (that is, if the RS latch 132 enables a WAIT signal S130), the counter 134 decrements a count value each time the AND gate 133 outputs a clock S132 to the counter 134. When the count value becomes negative, the counter 134 outputs an underflow signal to the RS latch 132. In addition, based on the underflow signal, the register 135 reloads, as an initial value, the preset time on the counter 134. If the RS latch 132 outputs no WAIT signal S130 (that is, if the RS latch 132 disables a WAIT signal S130), the AND gate 133 disables a clock S132 to be outputted to the counter 134, so that the counter 134 halts.

The edge detection unit 131 detects a rising edge of an interrupt signal S140 outputted from the delay section 140, and outputs a detection signal to the RS latch 132.

The RS latch 132 is set based on a detection signal (an interrupt signal S140) outputted from the edge detection unit 131 to enable a WAIT signal S130, and is reset based on an underflow signal outputted from the counter 134 to disable a WAIT signal S130.

With the aforementioned configuration, the timer section 130 receives an interrupt signal S140 outputted from the delay section 140 to thereby enable a WAIT signal S130. Then, the timer section 130 counts a preset time (a time set by the register 135) to thereby disable a WAIT signal S130. However, during the counting operation, that is, during measurement of a time, the timer section 130 outputs a WAIT signal S130 in an enable state.

Next, description will be given of the delay section 140 with reference to a block diagram in FIG. 3.

Figure 3:
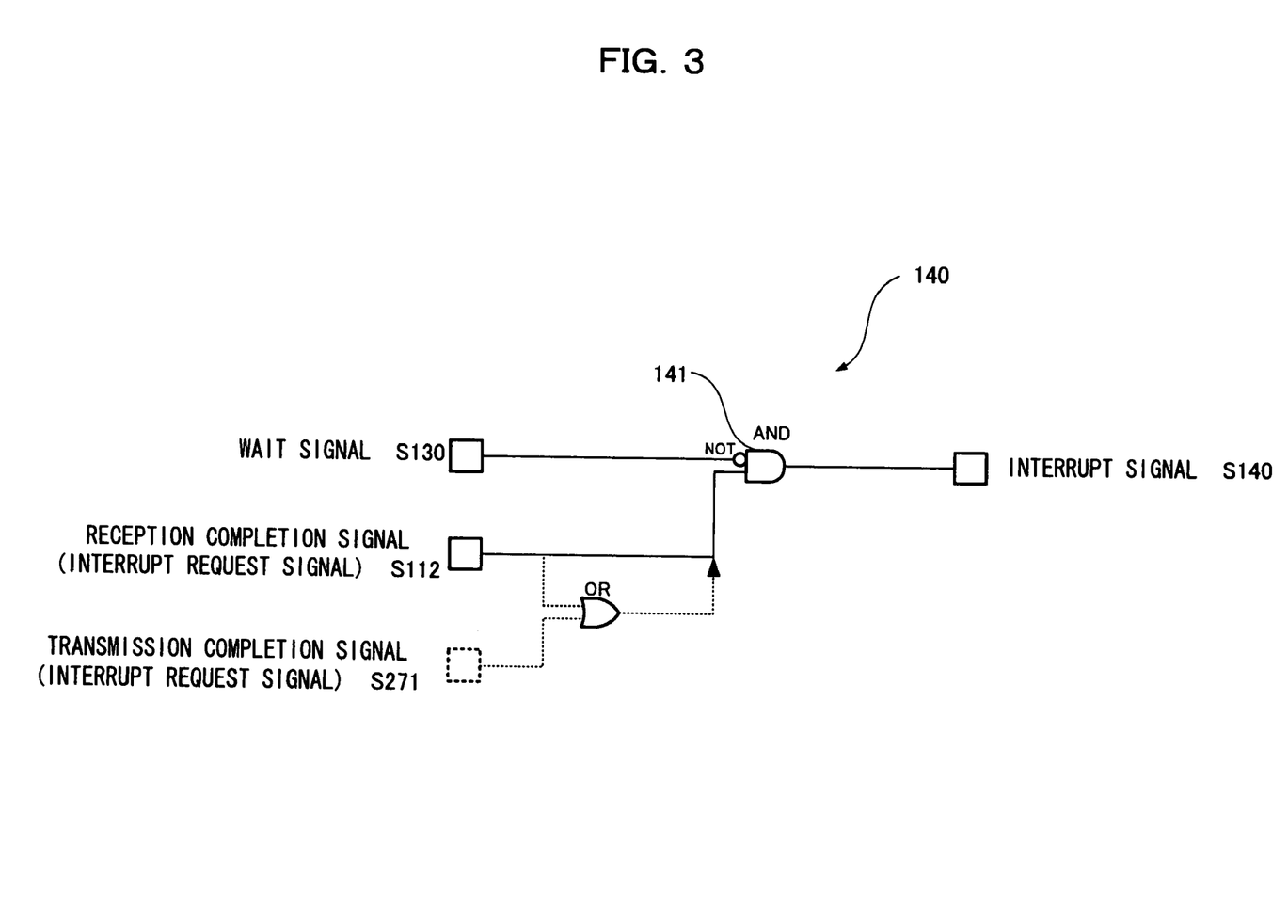
FIG. 3 is a block diagram illustrating a configuration of a delay section in the network hardware device.

As illustrated in FIG. 3, an AND gate 141 outputs a reception completion signal (an interrupt request signal) S112 as an interrupt signal S140 when a WAIT signal S130 is disabled or enters a disable state. An interrupt signal S140 is obtained by gating a reception completion signal (an interrupt request signal) S112 by means of a WAIT signal S130. As described above, the delay section 140 outputs a reception completion signal S112 as a reception interrupt signal S140 or outputs a delayed reception completion signal S112 in accordance with an enable/disable state of a WAIT signal S130.

Next, description will be given of operations of the network hardware device 100 with reference to a waveform chart in FIG. 4.

Timing (a): In a case that the timer section 130 performs no counting operation, that is, in a case that the timer section 130 does not measure a time and disables a WAIT signal S130, when the reception section 110 outputs a reception completion signal S112, the delay section 140 enables an interrupt signal S140.

Timing (b): Based on detection of an interrupt signal S140, the RS latch 132 of the timer section 130 is set to enable a WAIT signal S130, and the counter 134 of the timer section 130 starts to perform a counting operation and measures a time.

Timing (C): The host CPU 150 accepts an interrupt signal S140, executes the aforementioned processing. After completion of the processing, the host CPU 150 outputs a processing completion signal S150 to the reception section 110 to halt output of a reception completion signal (an interrupt request signal) S112 by the reception section 110. As a result, the delay section 140 disables an interrupt signal S140.

Timing (d): In the timer section 130, the counter 134 outputs an underflow signal to reset the RS latch 132 after a lapse of a preset time, and halts output of a WAIT signal S130 (disables a WAIT signal S130). When a WAIT signal S130 is disabled, the counter 134 halts a counting operation, and the register 135 reloads, as an initial value, a preset time on the counter 134.

Timing (e): In a case that the timer section 130 performs a counting operation (measures a time), that is, in a case that the timer section 130 enables a WAIT signal S130, the delay section 140 outputs no interrupt signal S140 even when the reception section 110 outputs a reception completion signal S112.

Timing (f): When the timer section 130 halts a counting operation after a lapse of a preset time and disables a WAIT signal S130, the delay section 140 outputs an interrupt signal S140 in a case that the reception section 110 outputs a reception completion signal S112. In other words, a reception completion signal S112 is delayed and, then, is outputted as an interrupt signal S140.

As described above, the configuration and operations of the network hardware device 100 according to the first embodiment can produce the following effects. Output of a (reception) interrupt signal S140 to the host CPU 150 is halted in a case that a WAIT signal S130 is enabled, that is, in a case that the timer section 130 measures a time (performs a counting operation). As a result, an interval of the output of the interrupt signal S140 can be positively made longer than a time (a cycle) preset by the register 135 of the timer section 130 (can be delayed) without depending on a count of data (a count of packets) transmitted from the network. Accordingly, it is possible to readily design the network hardware device 100 so as to prevent occurrence of hindrance of a function (as an internet home appliance) due to frequent occurrence of reception interrupt by the network. In addition, the network hardware device 100 can address each reception interrupt. Therefore, the host CPU 150 having no data to be received does not perform a process for confirming reception of data. Thus, it is possible to reduce a load on the host CPU 150.

Further, in a state that a WAIT signal S130 is disabled, output of a clock to the counter 134 is halted. Thus, it is possible to reduce an amount of electric power to be consumed by the counter 134.

Second Embodiment

Next, description will be given of a second embodiment of the present invention with reference to FIG. 5. It is to be noted that constituent elements illustrated in FIG. 5, equal to or corresponding to those illustrated in FIG. 1, are denoted by identical symbols; therefore, detailed description thereof will not be given here.

Figure 5:
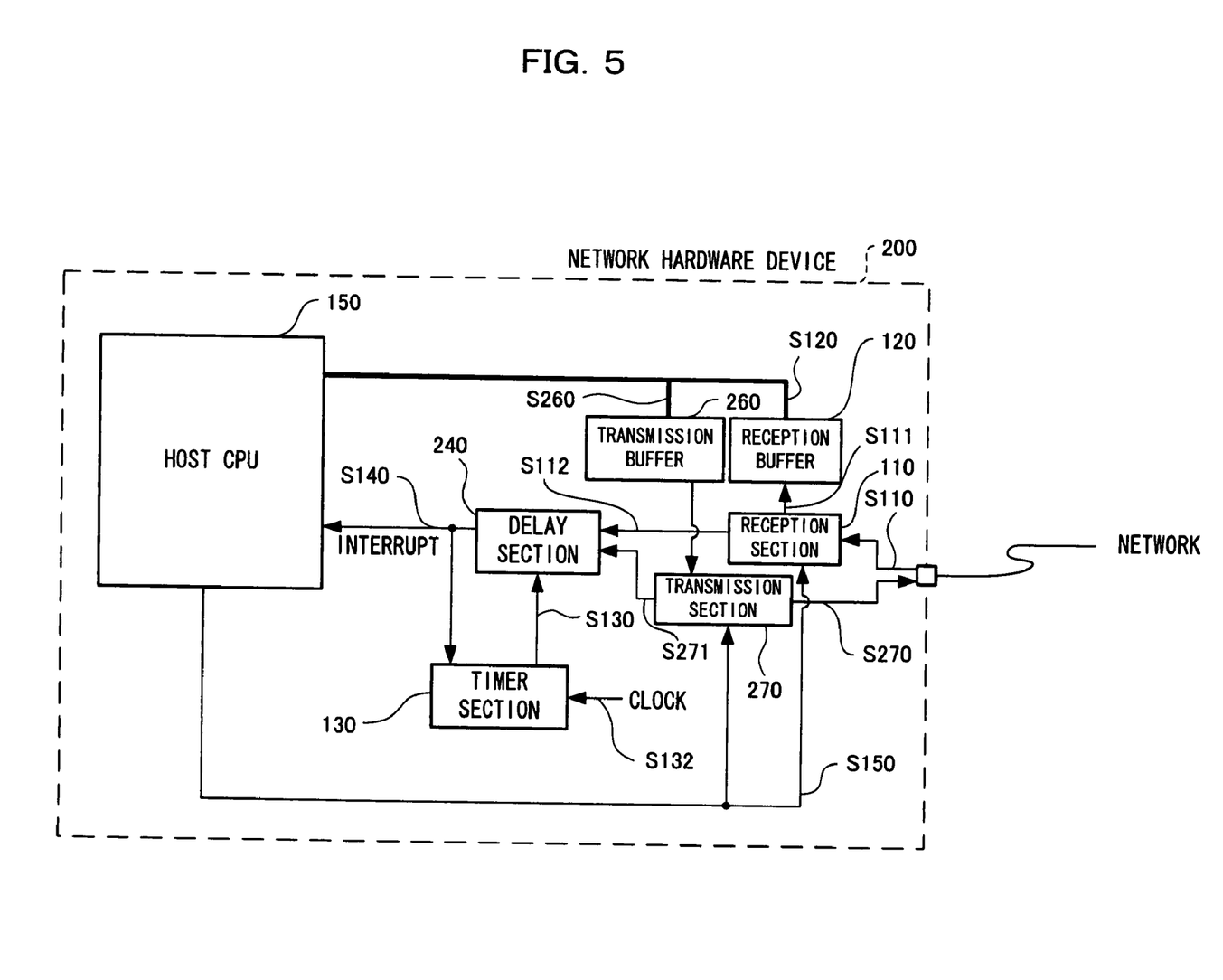
FIG. 5 is a block diagram illustrating a configuration of a network hardware device according to a second embodiment of the present invention.

FIG. 5 is a block diagram illustrating main components of a network hardware device according to the second embodiment of the present invention. Hereinafter, description will be mainly given of difference between the first embodiment and the second embodiment.

As illustrated in FIG. 5, the network hardware device (the main body) 200 according to the second embodiment of the present invention additionally includes a transmission buffer 260 and a transmission section 270.

The transmission buffer 260 stores transmission data S260 outputted from a host CPU 150.

The transmission section 270 outputs transmission data S270 stored in the transmission buffer 260 to a network. Upon completion of the transmission or upon occurrence of a transmission error, the transmission section 270 outputs a transmission completion signal S271 to a delay section 240.

The delay section 240 receives a reception completion signal S112 and a transmission completion signal S271. As shown by two-dot lines in FIG. 3, the delay section 240 outputs the reception completion signal S112 or the transmission completion signal S271 as a reception interrupt signal S140 or outputs the delayed reception completion signal S112 or the delayed transmission completion signal S271 based on a state of a logical OR of the reception completion signal S112 and the transmission completion signal S271 and a state of a WAIT signal S130.

According to the second embodiment, as described above, output of a (reception) interrupt signal S140 to the host CPU 150 is halted in a state that a WAIT signal S130 is enabled, that is, a timer section 130 performs a counting operation (measures a time). As a result, an interval of output of an interrupt signal S140 can be positively made longer than a time (a cycle) preset by a register 135 of the timer section 130. In other words, such output of an interrupt signal S140 can be delayed. Hence, an interval of transmission/reception interrupt is made longer than a desired interval. Thus, it is possible to readily prevent hindrance of a function as a home appliance even when transmission/reception interrupt is frequently occurred.

Third Embodiment

Next, description will be given of a third embodiment of the present invention with reference to FIGS. 6 and 7. It is to be noted that constituent elements illustrated in FIG. 6, equal to or corresponding to those illustrated in FIG. 1, are denoted by identical symbols; therefore, detailed description thereof will not be given here.

Figure 6:
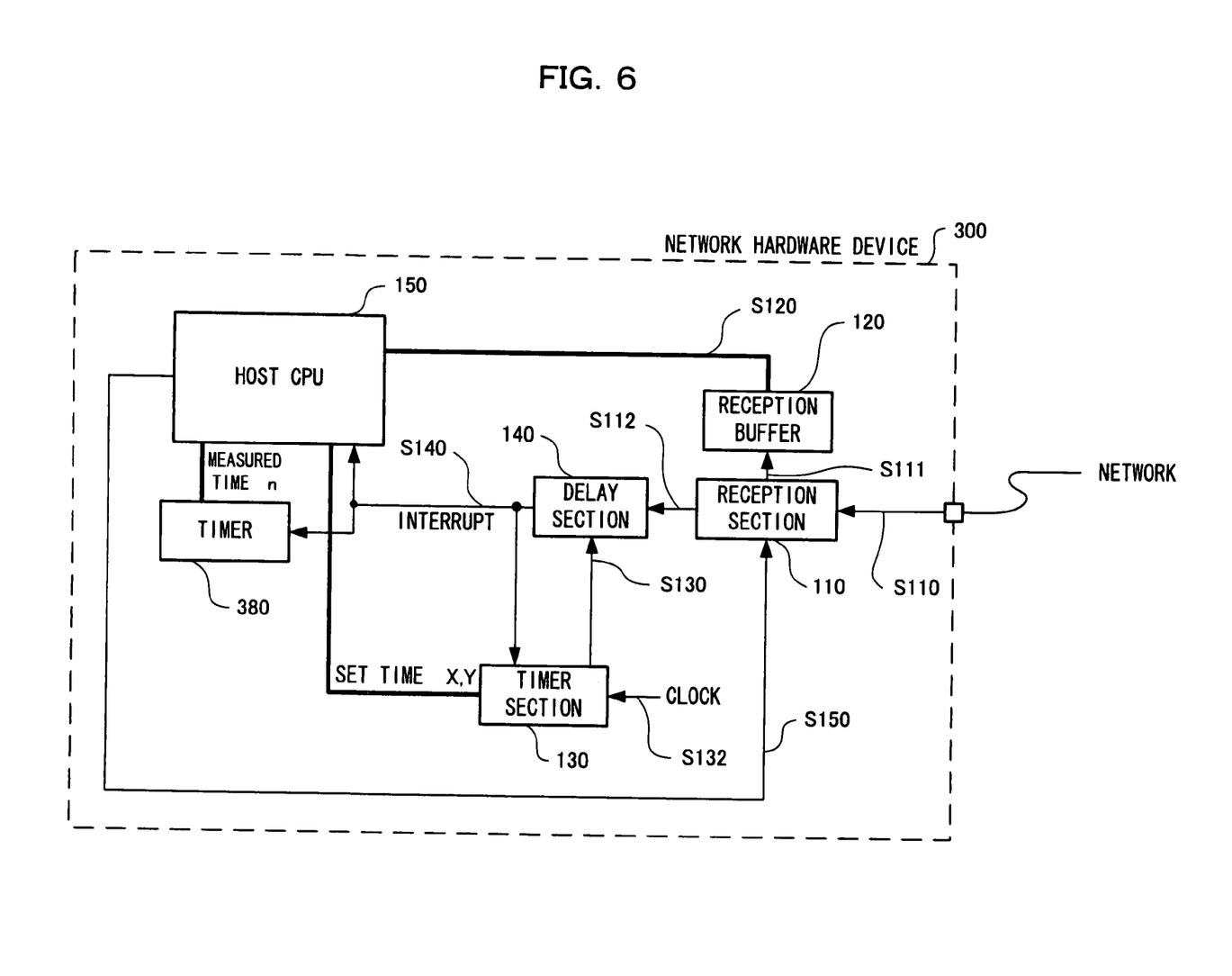
FIG. 6 is a block diagram illustrating a configuration of a network hardware device according to a third embodiment of the present invention.
Figure 7:
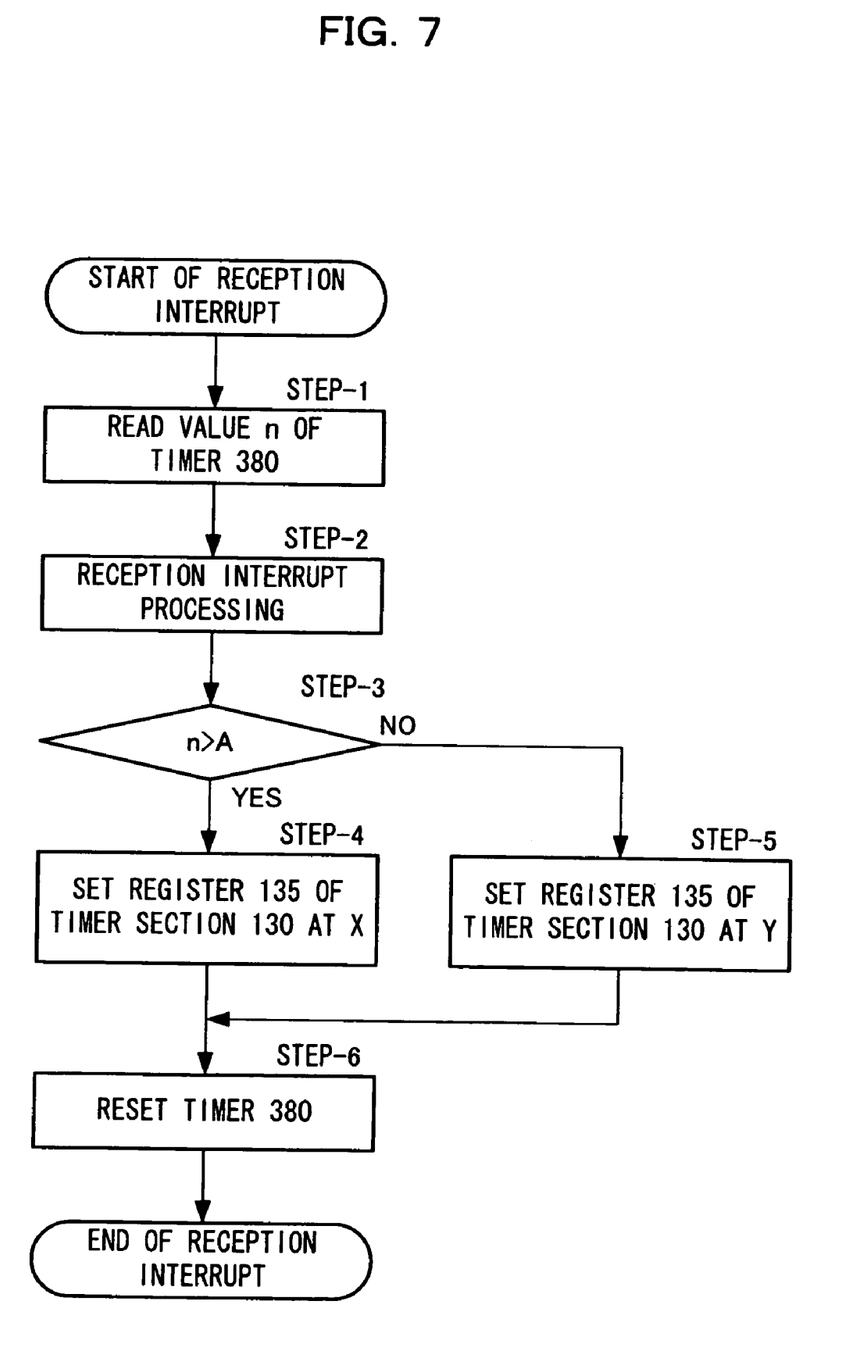
FIG. 7 is a flow chart showing operations of a host CPU in the network hardware device.

FIG. 6 is a block diagram illustrating main components of a network hardware device according to the third embodiment of the present invention. Hereinafter, description will be mainly given of difference between the first embodiment and the third embodiment.

As illustrated in FIG. 6, the network hardware device (the main body) 300 according to the third embodiment of the present invention additionally includes a timer 380.

The timer 380 starts to measure a time based on an interrupt signal S140, and outputs an elapsed time (a measured time n) to a host CPU 150. Thus, the host CPU 150 can be acquainted with an elapsed time since reception of an interrupt signal S140.

Next, description will be given of operations of the host CPU 150 with reference to a flow chart in FIG. 7. The host CPU 150 starts to execute reception interrupt processing based on an interrupt signal S140.

First, the host CPU 150 reads a time measured by the timer 380 to examine a measured time n from reception of an interrupt signal S140 to start of reception interrupt (Step 1).

Then, the host CPU 150 executes reception interrupt processing (Step 2).

After completion of the reception interrupt processing, the host CPU 150 compares the measured time n with a preset time A (Step 3).

As a result of the comparison, if the measured time n is longer than the time A, the host CPU 150 sets a register 135 of a timer section 130 at a set time X (Step 4). If the measured time n is shorter than the time A, the host CPU 150 sets the register 135 of the timer section 130 at a set time Y (Step 5). Herein, the set time X is longer than the set time Y.

Next, the host CPU 150 resets the timer 380, halts the timer 380 until reception of a subsequent interrupt signal S140 (Step 6), and finishes the reception interrupt processing.

As described above, the timer 380 measures a time from reception of an interrupt signal S140 by the host CPU 150 to actual start of reception interrupt by the host CPU 150. In accordance with this measured time n, the host CPU 150 changes a time to be set for the register 135 of the timer section 130. More specifically, if the measured time n is long, it is determined that a processing load on the host CPU 150 is large. Based on this determination, the host CPU 150 sets the register 135 of the timer section 130 at the set time X which is relatively long, so that an interrupt interval is made longer. On the other hand, if the measured time n is short, it is determined that the processing load on the host CPU 150 is small. Based on this determination, the host CPU 150 sets the register 135 of the timer section 130 at the set time Y which is relatively short, so that the interrupt interval is made shorter.

According to the third embodiment, as described above, magnitude of the processing load on the host CPU 150 is measured based on a time from reception of an interrupt signal S140 by the host CPU 150 (start of an operation by the timer 380) to acceptance of interrupt by the host CPU 150, and a time set for the timer section 130 is changed. Thus, an interrupt cycle can be changed based on the measured processing load on the host CPU 150. As a result, it is possible to readily prevent hindrance of a function as a home appliance due to frequent occurrence of reception interrupt, in accordance with the measured processing load on the host CPU 150.

Fourth Embodiment

Next, description will be given of a fourth embodiment of the present invention with reference to FIGS. 8 and 9. It is to be noted that constituent elements illustrated in FIG. 8, equal to or corresponding to those illustrated in FIG. 1, are denoted by identical symbols; therefore, detailed description thereof will not be given here.

Figure 8:
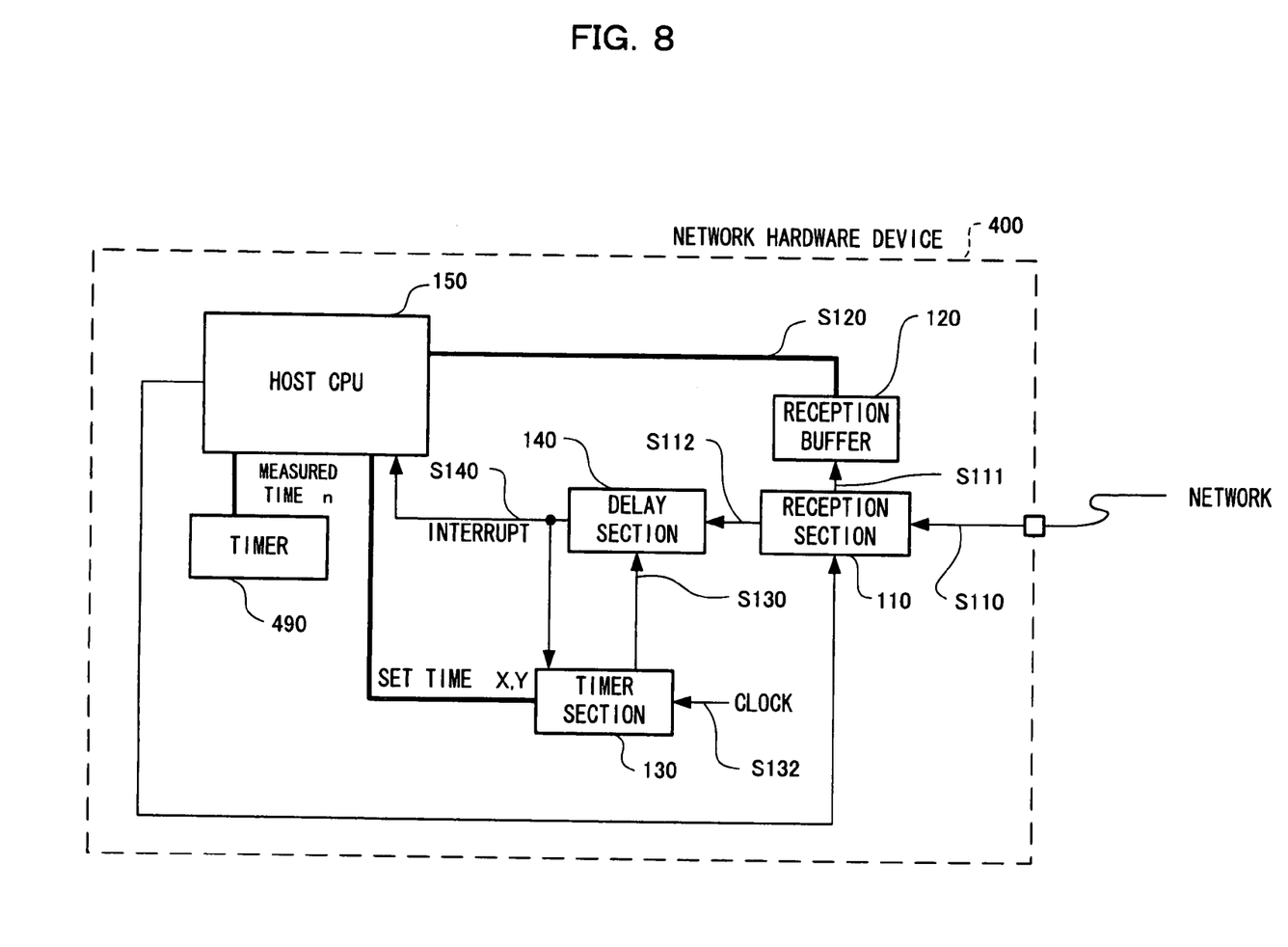
FIG. 8 is a block diagram illustrating a configuration of a network hardware device according to a fourth embodiment of the present invention.
Figure 9:
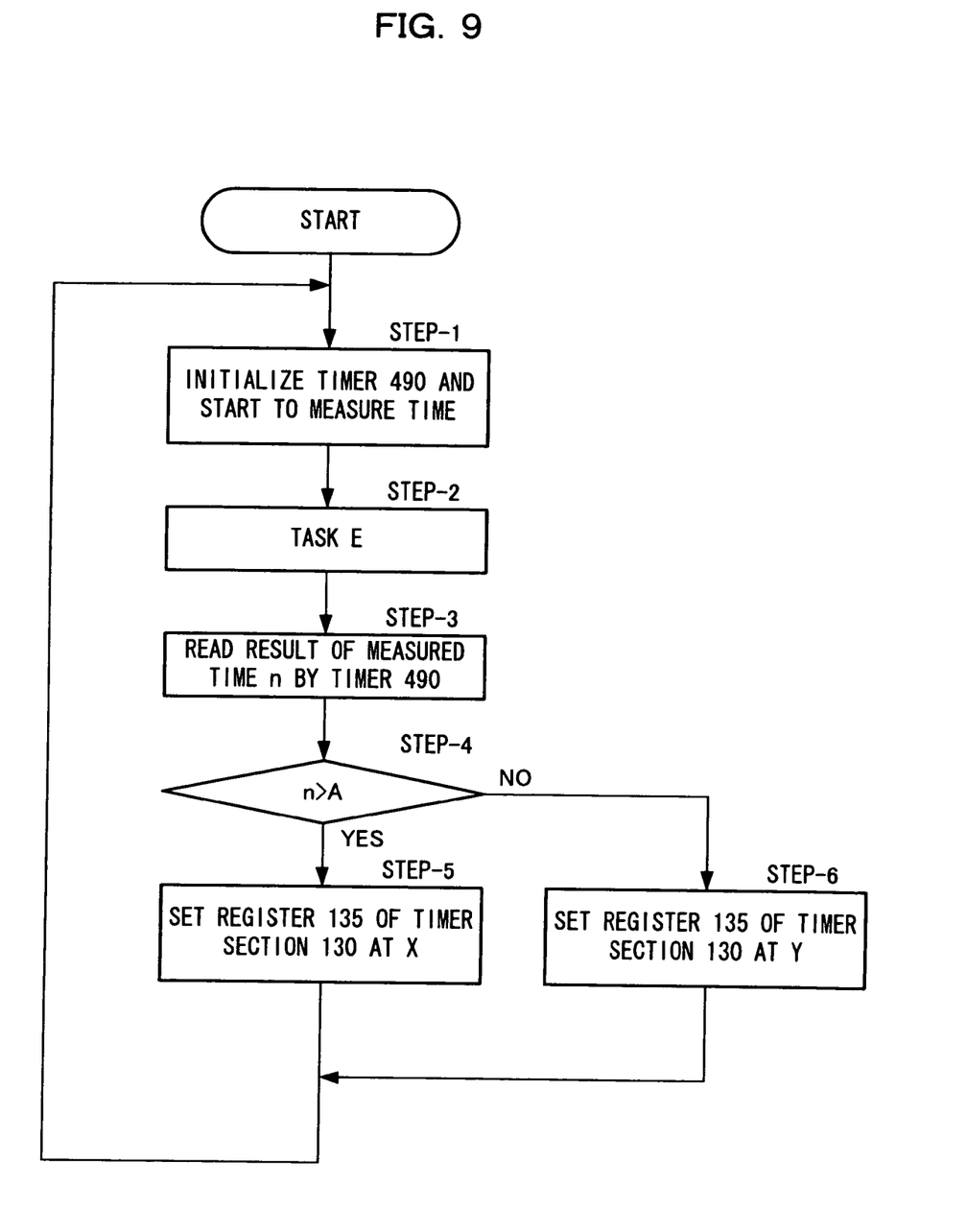
FIG. 9 is a flow chart showing operations of a host CPU in the network hardware device.

FIG. 8 is a block diagram illustrating main components of a network hardware device according to the fourth embodiment of the present invention. Hereinafter, description will be mainly given of difference between the first embodiment and the fourth embodiment.

As illustrated in FIG. 8, the network hardware device (the main body) 400 according to the fourth embodiment of the present invention additionally includes a timer 490.

The timer 490 is connected to a host CPU 150, starts to measure a time based on an initialization signal outputted from the host CPU 150, and outputs an elapsed time (a measured time n) to the host CPU 150. Thus, the host CPU 150 can be acquainted with the elapsed time.

Next, description will be given of operations of the host CPU 150 with reference to a flow chart in FIG. 9.

Of tasks (specific items) to be executed repeatedly, the host CPU 150 performs initialization of the timer 490 and measurement of a time (Step 1).

After the timer 490 starts to measure a time, the host CPU 150 executes a task E (a specific item) to be processed (Step 2).

Upon execution of the task E, the host CPU 150 reads a measured time n from the timer 490 (Step 3).

Subsequently, the host CPU 150 compares the measured time n with a present time A (Step 4).

As a result of the comparison, if the measured time n is longer than the time A, the host CPU 150 sets a register 135 of a timer section 130 at a set time X (Step 5). If the measured time n is shorter than the time A, the host CPU 150 sets the register 135 of the timer section 130 at a set time Y (Step 6). Herein, the set time X is longer than the set time Y.

As described above, in accordance with a time elapsed until the host CPU 150 starts to execute processing of the task E, a time set for the register 135 of the timer section 130 is changed. More specifically, if the measured time n is long, it is determined that a time elapsed until the host CPU 150 starts to execute processing of the task E is long, in other words, a processing load on the host CPU 150 is large. Based on this determination, the host CPU 150 sets the register 135 of the timer section 130 at the set time X which is relatively long, so that an interrupt cycle is made longer. On the other hand, if the measured time n is short, it is determined that the time elapsed until the host CPU 150 starts to execute processing of the task E is short, in other words, the processing load on the host CPU 150 is small. Based on this determination, the host CPU 150 sets the register 135 of the timer section 130 at the set time Y which is relatively short, so that an interrupt cycle is made shorter.

According to the fourth embodiment, as described above, the time n elapsed until start of the processing of the task E is measured. More specifically, magnitude of the processing load on the host CPU 150 is measured based on a time from reception of an interrupt signal S140 by the host CPU 150 to execution of processing of a task (a specific item) by the host CPU 150, so that a time set for the timer section 130 is changed. Thus, an interrupt cycle can be changed based on the measured processing load on the host CPU 150. As a result, it is possible to readily prevent hindrance of a function (as an internet home appliance) due to frequent occurrence of reception interrupt, in accordance with the measured processing load on the host CPU 150.

Figure 2:
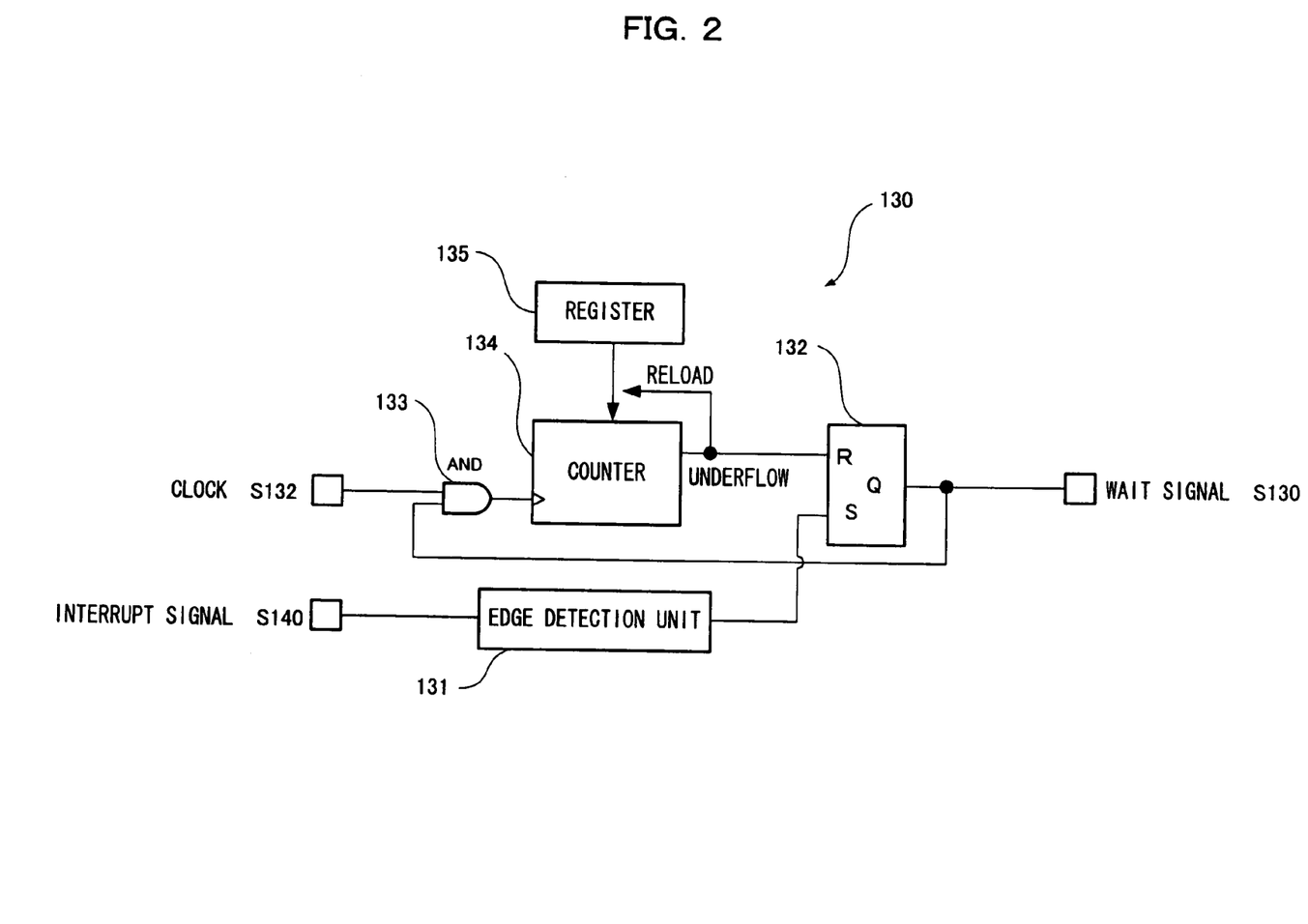
FIG. 2 is a block diagram illustrating a configuration of a timer section in the network hardware device.
Figure 4:
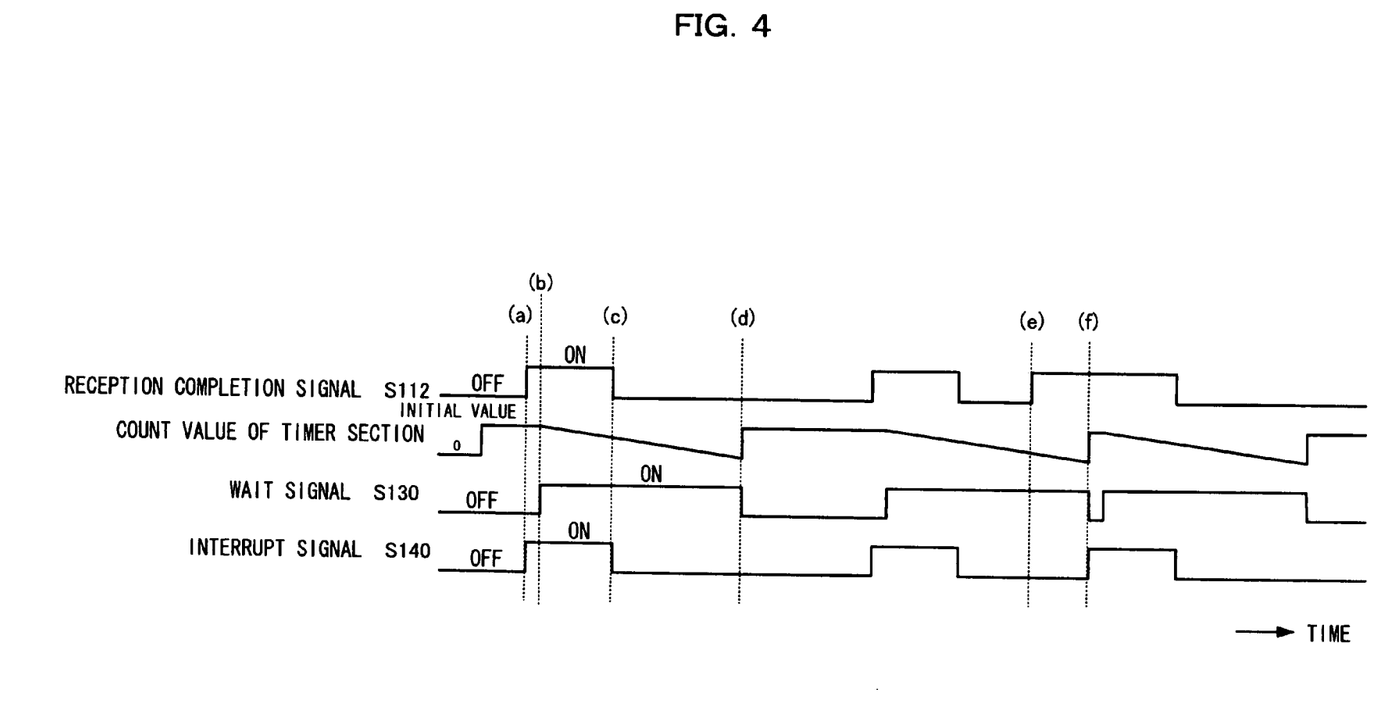
FIG. 4 is a waveform chart of signals indicating operations of the network hardware device.

In the first to fourth embodiments, the timer section 130 and the delay sections 140 and 240 are configured as illustrated in FIGS. 2 and 3; however, the present invention is not limited thereto as long as these components can adjust timing as shown in FIG. 4.

In the first to fourth embodiments, a down counter is used as the timer section 130; however, an up counter may be used as long as it can measure a preset time.

The timer section 130 according to each of the first to fourth embodiments can realize the following configuration: the counter 134 is halted without halt of output of clocks to the counter 134 when a WAIT signal S130 is disabled. However, if the output of the clocks is halted, an amount of electric power to be consumed by the counter 134 can be reduced.

In the third and fourth embodiments, two kinds of set times X and Y are set for the register 135; however, similar effects can be expected even when more kinds of times a reset. For example, the timer section 130 has g (an integer of not less than 2) kinds of preset times from a preset time 1 to a preset time g. If a processing load is large, the host CPU 150 selects a time measured relatively longer from preset times m ($1 \leq m \leq g$). On the other hand, if the processing load is small, the host CPU 150 selects a time measured relatively shorter from the preset times m ($1 \leq m \leq g$). These selected times are set for the register 135 of the timer section 130, respectively.

In the fourth embodiment, the timer 490 measures only the task E; however, similar effects can be expected even when the timer 490 measures q (an integer of not less than 2) kinds of tasks.

The network hardware device according to the present invention has a reception interrupt delay function of prohibiting reception interrupt by a network in a cycle shorter in length than a preset cycle. Therefore, the network hardware device according to the present invention is effective for an internet home appliance or the like where delay or halt of an operation thereof is unforgiven.

What is claimed is:

1. A network hardware device connected to a network, comprising:
   a host controller executing processing based on data transmitted from the network;
   a reception buffer storing data transmitted from the network;
   a reception section receiving data transmitted from the network, allowing the reception buffer to store the received data, and outputting a completion signal indicating one of completion of the reception and occurrence of an error;
   a timer section measuring a preset time, and enabling a WAIT signal during the measurement; and
   a delay section generating an interrupt signal indicating one of completion of the reception and occurrence of the error upon reception of the completion signal from the reception section, outputting the interrupt signal to the timer section and the host controller when the timer section disables a WAIT signal, suspending output of the interrupt signal when the timer section enables a WAIT signal, and outputting the interrupt signal to the timer section and the host controller when the timer section disables a WAIT signal again, wherein
   the timer section starts to measure a time upon reception of an interrupt signal from the delay section without depending on a count of packets of the received data, enables a WAIT signal during the measurement, and disables a WAIT signal after a lapse of a preset time,
   the preset time period for the timer section includes g (an integer of not less than 2) kinds of preset times from a preset time 1 to a preset time g, and
   based on measured magnitude of a processing load, the host controller is for selecting a time measured relatively longer from preset times m ($1 \leq m \leq g$) when the processing load is large, selecting a time measured relatively shorter from the preset times m ($1 \leq m \leq g$) when the processing load is small, and setting the timer section at the respective selected times.

2. The network hardware device according to claim 1, further comprising:
   a transmission buffer storing transmission data outputted from the host controller; and
   a transmission section transmitting the transmission data stored in the transmission buffer to the network, and outputting a completion signal indicating one of completion of the transmission and occurrence of an error, wherein
   the delay section generates an interrupt signal indicating one of completion of the reception, completion of the transmission and occurrence of the error upon reception of a completion signal from one of the reception section and the transmission section, and outputs the interrupt signal to the timer section and the host controller when the timer section disables a WAIT signal.

3. The network hardware device according to claim 2, wherein the reception section outputs a completion signal indicating occurrence of an error to the delay section when the reception buffer becoming full of data fails to newly receive data corresponding with one packet.

4. The network hardware device according to claim 2, wherein the timer section includes a counter counting a clock to thereby measure a time, and halts output of a clock to the counter when the counter does not perform the measurement.

5. The network hardware device according to claim 1, wherein the reception section outputs a completion signal indicating occurrence of an error to the delay section when the reception buffer becoming full of data fails to newly receive data corresponding with one packet.

6. The network hardware device according to claim 1, wherein the timer section includes a counter counting a clock to thereby measure a time, and halts output of a clock to the counter when the counter does not perform the measurement.

7. The network hardware device according to claim 1, wherein a magnitude of the processing load on the host controller is measured based on a time period from reception of the interrupt signal by the host controller to actual acceptance of interrupt by the host controller.

8. The network hardware device according to claim 1, wherein a magnitude of the processing load on the host controller is measured based on a time period from reception of the interrupt signal by the host controller to execution of processing of a specific item by the host controller.

* * * * *